Patented Sept. 17, 1929

1,728,378

UNITED STATES PATENT OFFICE

VICTOR H. TURKINGTON, OF CHICAGO, ILLINOIS, ASSIGNOR TO BAKELITE CORPORATION, OF NEW YORK, N. Y., A CORPORATION OF DELAWARE

MOLDING MIXTURE AND METHOD OF MAKING THE SAME

No Drawing.   Application filed December 11, 1922.   Serial No. 606,290.

This invention relates to molding mixtures of the phenolic condensation product type, and comprises a novel method whereby such molding mixtures may be prepared of improved quality and at lower cost as compared with the prior practice. My invention comprises also the novel product resulting from the practice of this method.

Heretofore, in the compounding of phenolic plastics it has been customary to incorporate the resin and the filler by a prolonged mixing or kneading operation carried out in ball mills, beater mills, kneading machines, dough mixers, rubber rolls or similar appliances. The resin, (which may be either of the reactive type, or of the nonreactive type admixed with a hardening agent of the aldehyde or methylene class) is commonly supplied as a varnish or solution in a neutral or non-reactive volatile solvent, which is later expelled by subjecting the kneaded mass to prolonged air- or vacuum-drying. Various modifications of the above procedure have been used, but the principle has remained essentially unchanged, and all prior procedures have been characterized by high power and labor costs, as well as by operating difficulties attendant upon the use and recovery of a non-reactive solvent.

According to the present invention these several disadvantages are overcome by the employment in conjunction with the resin and the filler, of a substance capable of performing the triple function of a solvent for the resin, a plasticizing agent for the mass, and a reactive agent or hardener for the resin. For this purpose I may use any aldehyde or aldehyde derivative having a sufficiently high boiling point, say substantially above 100° C., and reactive toward phenol resins. Benzaldehyde for example may be used, but I now prefer to employ furfural, which possesses in high degree all of the desirable characteristics mentioned above. Among a variety of available procedures the following is preferred, for the compounding of a molding mixture containing wood-flour as a filler.

The wood-flour is first charged into a steam-heated kneading machine and is stirred therein until thoroughly dried. Thereupon I add furfural or equivalent high-boiling reactive aldehyde, preferably in the proportion of about ten percent by weight of the wood-flour, or slightly more. If desired, any appropriate dye, according to the color required, may be introduced in solution in the aldehyde. At the same time with the furfural, and while the kneader is running, a suitable methylene-containing hardening agent, preferably hexamethylenetetramine in the form of fine dry powder, is likewise introduced, and the operation of the machine is continued for several minutes, or until the furfural, dye and hexamethylenetetramine have been thoroughly and uniformly distributed through the wood-flour. The quantity of hexamethylenetetramine added is suitably proportioned to the amount and quality of the non-reactive phenolic resin to be subsequently added, suitable proportions being about 15 parts by weight of hexamethylenetetramine for each 200 parts of a phenol resin prepared by thoroughly reacting 7.5 mols of phenol with 6 mols of an active methylene, preferably formaldehyde. The resin thus prepared is of the non-reactive or permanently fusible type, and should be hard, brittle and readily powdered at ordinary temperatures, but liquid and permanently fusible at elevated temperatures, say 140° C. The total quantity of resin employed in a typical case may be approximately equal to the combined weights of the wood-flour and the furfural. The resin is preferably added slowly to the mixture in order to avoid lumping or jamming of the mill, and the kneading is continued at a temperature approximating 100° C. until the mass is thoroughly homogeneous. The mix is then dumped onto a cooling table, and after cooling is cold-ground to suitable mesh for use as a molding powder.

The method as above described may be modified in various ways without departure from my invention and in accordance with the particular filler used and the qualities desired in the product. As compared with prior practice it presents at least four distinct advantages as follows: (1) increased impregnation of the fibrous filler, giving finer surfaces on the molded article; (2) a substantial increase in the tensile strength and dielectric strength of the article; (3) a decided decrease in the power costs; and (4) a decrease in labor cost. Under the best operating conditions power and labor costs may each be reduced about one-half as compared with prior requirements.

While I have described as a preferred procedure the use of a non-reactive or permanently fusible resin in conjunction with hexamethylenetetramine as a hardener, it will be understood by those skilled in this art that I may substitute therefor, either wholly or in any desired proportion, a reactive resin, with corresponding reduction or omission of the hexamethylenetetramine. In either case the furfural or equivalent high-boiling aldehyde appears to enter eventually into reaction with the phenol or phenolic resins, or otherwise to become an integral part of the ultimate molded product. The expression "potentially reactive phenolic resin" is therefore to be understood as designating either such resins as are directly capable of transformation into an infusible body under application of sufficient heat, or, alternatively, mixtures of the permanently fusible resins with a methylene-containing hardening agent capable of imparting to them the potentially reactive character. Similarly the term "aldehyde" is to be regarded as including generally reactive bodies of aldehyde derivation or type, and equivalent to benzaldehyde or furfural for the purposes of this invention. Among the aldehyde bodies which may be substituted wholly or in part for furfural in the practice of this invention I may mention such substances as benzaldehyde, hexoic aldehyde, isohexyl aldehyde, manno-heptose, methyl-furfural, nitro-benzaldehyde, phenyl-acetaldehyde, tetra-hydro-benzaldehyde, and many others of analogous character.

I claim:

1. A molding mixture comprising in intimate admixture a potentially reactive phenolic resin composition including a methylene-containing hardening agent, a filling material, and a reactive aldehyde having a boiling point substantially above 100° C.

2. A molding mixture comprising in intimate admixture a potentially reactive phenolic resin composition including a methylene-containing hardening agent, a filling material, and furfural.

3. A molding mixture comprising in intimate admixture a phenolic resin, hexamethylenetetramine in proportion to render the same potentially reactive, a filling material, and a reactive aldehyde having a boiling point substantially above 100° C.

4. A molding mixture comprising in intimate admixture a phenolic resin, hexamethylenetetramine in proportion to render the same potentially reactive, a filling material, and furfural.

5. Method of preparing molding mixtures of the phenolic condensation product type, which comprises intermixing a filling material, a potentially reactive phenolic resin composition including a methylene-containing hardening agent, and a plasticizing agent comprising a reactive aldehyde having a boiling point substantially above 100° C.

6. Method of preparing molding mixtures of the phenolic condensation product type, which comprises intermixing a filling material, a potentially reactive phenolic resin composition including a methylene-containing hardening agent, and furfural.

7. Method of preparing molding mixtures of the phenolic condensation product type, which comprises intermixing a filling material, a phenolic resin, hexamethylene-tetramine, and a plasticizing agent comprising a reactive aldehyde having a boiling point substantially above 100° C.

8. Method of preparing molding mixtures of the phenolic condensation product type, which comprises intermixing a filling material, a phenolic resin, hexamethylene-tetramine, and furfural.

In testimony whereof, I affix my signature.

VICTOR H. TURKINGTON.